I. DUYSENS.
ARMORED PNEUMATIC TIRE.
APPLICATION FILED JULY 15, 1916.
1,223,776.
Patented Apr. 24, 1917.
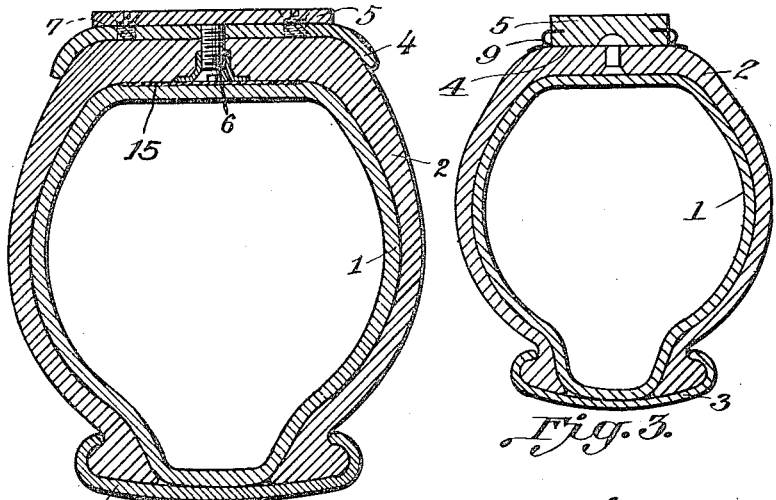
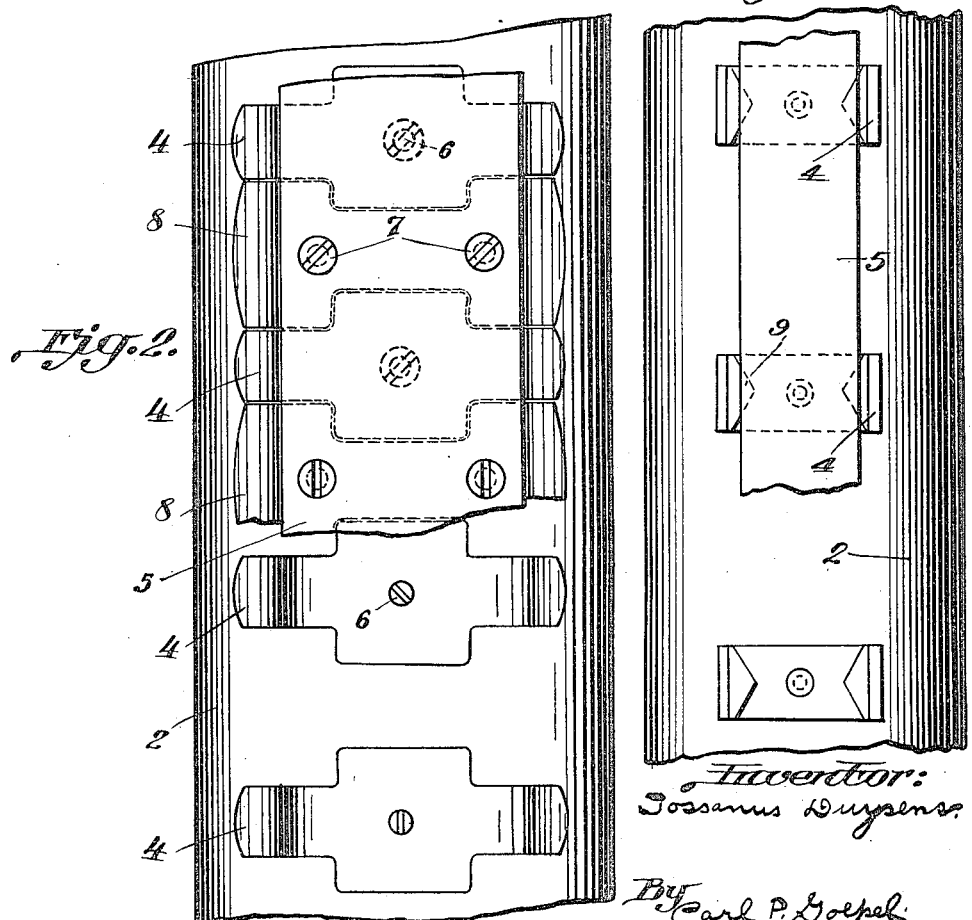

UNITED STATES PATENT OFFICE.

TOSSANUS DUYSENS, OF MAASTRICHT, NETHERLANDS, ASSIGNOR OF ONE-HALF TO RENÉ HUSTINX, OF MAASTRICHT, NETHERLANDS.

ARMORED PNEUMATIC TIRE.

1,223,776.  Specification of Letters Patent.  Patented Apr. 24, 1917.

Application filed July 15, 1916. Serial No. 109,543.

*To all whom it may concern:*

Be it known that I, TOSSANUS DUYSENS, a subject of the Queen of the Netherlands, residing at Gubbelstraat 21, Maastricht, Netherlands, have invented a new and useful Improvement in Armored Pneumatic Tires, of which the following is a specification.

This invention relates to armored pneumatic tires for automobiles, motorcycles, bicycles and other vehicles wherein a solid angular tread band of leather or similar resistive material is used to form the tread. In tires of this class now in ordinary use, the tread bands are curved transversely and such curvature causes considerable stress between the tread band and the tire and also induces a variation in the width of the tread under the weight of the load. Such variation increases the running resistance.

The principal object of this invention is to provide a tire of this character in which the tread is not liable to change its width transversely to the circumference of the wheel under running conditions, thus rendering the tire free from the disadvantages above referred to.

The drawing illustrates various methods of carrying out the invention.

Figure 1 is a transverse section of one form of the invention.

Fig. 2 is a plan view of part of a tire illustrated in Fig. 1.

Figs. 3 and 4 are views corresponding to Figs. 1 and 2 respectively of a construction specially suitable for cycles.

Referring to Figs. 1 and 2 of the drawings the numeral 1 designates the air tube, and 2 the outer cover which are secured to the felly 3 in the usual way. The plates above referred to for the purpose of fastening the tread band are marked 4, and the tread band itself 5.

The fastening plates 4 are secured by means of screws 6, the heads of which are counter-sunk in the inner side of the outer cover 2 and separated from the air tube 1, by canvas lining 15 or the like and, as shown in Fig. 2, they are arranged upon the circumference of the outer cover at definite intervals from one another. The plates 4 are shaped in such manner that the space between them assumes a form somewhat similar in shape to a cross section of an I-beam.

To the inner side of the annular tread band 5, which may be made of leather or other similar resistive material, are secured, by means of screws 7, plates 8, which correspond exactly in form and number with the interspaces between the fastening plates 4. When the air tube is deflated, the annular tread band can be shifted around the tire in such manner as to cause the I-shaped plates 8 of the tread band to fit in the corresponding spaces between the plates 4 on the outer cover 2. When the tire is inflated, it expands and the plates 4 are driven against the tread band, and the plates 8 against the outer cover, while at the same time the tread band becomes tightened up and in consequence thereof and of the position of the plates 8, it becomes firmly attached to the tire in the corresponding interspaces between the plates 4.

Another method which is particularly suitable for cycles, is illustrated in Figs. 3 and 4. In this instance, the plates 4 attached to the outer cover by means of rivets, are furnished with sharp points bent upward and inward between which is located the annular tread band 5. In this case the tread band, when the tire is deflated, is introduced between the points 9 and then tightened up in this position between the points 9, so that it assumes a transversely bent shape. As soon as the pneumatic tire is inflated, its circumference increases and the tread band gets more and more tightened up until it becomes quite flat, when the points 9 are completely driven into the lateral edges of the tread band and hold it firm.

Having thus fully described my invention, what I claim is:

1. A pneumatic tire comprising a cover provided with a series of plates fastened at intervals on the periphery thereof, and an annular tread band provided with a series of plates fastened at intervals to said tread band, the plates of said tread band being adapted to fit in the spaces between the plates of said cover.

2. A pneumatic tire comprising a cover provided with a series of plates fastened at intervals on the periphery thereof, and an annular tread band provided with a series of plates fastened at intervals to said tread band, the plates of said tread band being adapted to fit in the spaces between the plates of said cover and the plates of the respective series being provided with interlocking recesses and projections.

In testimony whereof I affix my signature in presence of two witnesses.

TOSSANUS DUYSENS.

Witnesses:
H. F. JORRETSMA,
R. G. GREEN.